United States Patent
Gonnsen et al.

(10) Patent No.: US 7,931,047 B2
(45) Date of Patent: Apr. 26, 2011

(54) ARRANGEMENT OF LINE CONNECTIONS FOR INSTALLATIONS IN AN AIRCRAFT PASSENGER CABIN

(75) Inventors: Johannes Gonnsen, Hamburg (DE); Markus Fokken, Hamburg (DE); Michael Dupont, Hamburg (DE); Michael Harriehausen, Hamburg (DE); Lars Lehmann, Hamburg (DE); Marc Scheel, Hamburg (DE); Stefan Repp, Hamburg (DE)

(73) Assignee: Airbus Deutschland GmbH (DE)

( * ) Notice: Subject to any disclaimer, the term of this patent is extended or adjusted under 35 U.S.C. 154(b) by 612 days.

(21) Appl. No.: 11/813,341

(22) PCT Filed: Feb. 14, 2006

(86) PCT No.: PCT/EP2006/001340
§ 371 (c)(1), (2), (4) Date: Jul. 3, 2007

(87) PCT Pub. No.: WO2006/087168
PCT Pub. Date: Aug. 24, 2006

(65) Prior Publication Data
US 2008/0116686 A1  May 22, 2008

Related U.S. Application Data

(60) Provisional application No. 60/653,699, filed on Feb. 17, 2005.

(30) Foreign Application Priority Data

Feb. 15, 2005 (DE) .......................... 10 2005 007 058

(51) Int. Cl.
*E03B 7/07* (2006.01)
(52) U.S. Cl. ..................................... 137/899.2; 244/131
(58) Field of Classification Search ............... 137/899.2; 244/119, 120, 131
See application file for complete search history.

(56) References Cited

U.S. PATENT DOCUMENTS

| | | | |
|---|---|---|---|
| 5,083,727 A | 1/1992 | Pompei et al. | |
| 5,232,010 A * | 8/1993 | Rozenblatt et al. | 137/899.2 |
| 5,303,739 A * | 4/1994 | Ellgoth et al. | 137/899.2 |
| 5,309,938 A * | 5/1994 | Ellgoth et al. | 137/899.2 |
| 6,315,332 B1 | 11/2001 | Aschoff et al. | 285/227 |
| 2004/0074547 A1 * | 4/2004 | Kirma | 137/899.2 |
| 2004/0123381 A1 | 7/2004 | Kitade et al. | |

FOREIGN PATENT DOCUMENTS

| | | |
|---|---|---|
| DE | 26 24 241 | 12/1977 |
| JP | 5 155 390 A | 6/1993 |
| RU | 34 479 U1 | 12/2003 |

OTHER PUBLICATIONS

International Search Report PCT/EP2006/001340 dated Apr. 6, 2006.

* cited by examiner

*Primary Examiner* — John Fox
(74) *Attorney, Agent, or Firm* — Ostrolenk Faber LLP

(57) ABSTRACT

The present invention relates to an arrangement of line connections for installations in an aircraft passenger cabin. The arrangement comprises a line connection element for accommodating several line connections; wherein the line connection element has a fixed position in the floor grid; wherein the line connections are adaptable to system lines of aircraft systems; and wherein the installations are adaptable by way of flexible inlet lines on the line connection element.

8 Claims, 3 Drawing Sheets

ARRANGEMENT OF LINE CONNECTIONS FOR INSTALLATIONS IN AN AIRCRAFT PASSENGER CABIN

CROSS REFERENCE TO RELATED APPLICATION

The present application is a 35 U.S.C. §§371 national phase conversion of PCT/EP2006/001340, filed 14 Feb. 2006, which claims the benefit of the filing date of German Patent Application No 10 2005 007 058.2 filed Feb. 15, 2005, and U.S. Provisional Patent Application No. 60/653,699 filed Feb. 17, 2005, the disclosures of which is herein incorporated by reference. The PCT Application was published in the English Language.

FIELD OF THE INVENTION

The invention relates to an arrangement of line connections for installations in an aircraft passenger cabin.

TECHNOLOGICAL BACKGROUND

Apart from the passenger seats, aircraft passenger cabins that are equipped for transporting passengers also comprise installations that are provided for the supply to passengers and/or the use by passengers. Such installations in an aircraft passenger cabin, for example toilets or galleys, are also referred to as monuments, and in their corresponding installation position are supplied with water, air etc. by way of the supply lines in the aircraft; or removal of waste water or of waste takes place by way of sanitation lines. Depending on requirements, there are for example individual system lines for vacuum, waste water, supplemental cooling or potable water.

Depending on individual requirements, monuments can be located in different positions in the aircraft cabin, and the system lines are positioned accordingly depending on the location of the connection points at the monuments.

In this arrangement each monument position requires an individual and separate adaptation of the required system inlet lines. Consequently there is a large variety of system inlets for all the identified monument locations. This is demonstrated in the description of FIG. 1 by means of an example. A top view of a section of a cabin layout is shown, which shows not only the actually used line connections and the connection flanges, but also shows alternative pipeline routes which have to be provided to maintain theoretical connection options. A change in a position of a monument is thus connected with considerable expenditure for rerouting the system inlet lines.

Providing connections spaced along the lines for different locations of installations in the aircraft cabin is known from U.S. Pat. No. 5,083,727. Thus, the supply and distribution lines, e.g., water line, air line, are laid in the upper area of passenger cabins and connected from above to the installations such as kitchens or toilets (see FIG. 2 or 8). Waste lines are positioned below the floor and also have multiple connections, which are provided with a "blind stopper" if not used (FIG. 16, 17). For a possible change of the position of these monuments, they are connected via supply lines to other connections, the unused connections being sealed. The supply lines and connections provided are essentially laid above the monuments; waste lines run below the floor. Therefore, all connections to the individually running system lines must be reproduced in the event of a change of the position of the monument.

SUMMARY OF THE INVENTION

Amongst other things, it may be an object of the invention to create line connections in the aircraft cabin such that for any change in the position of installations the necessary system lines can be connected without this involving great expenditure.

The system ports according to the invention are transition devices between the mechanical systems from below the floor panels and the monument, which transition devices may be fixedly arranged at defined positions in the floor grid. However, they are only installed if a monument, i.e. the installed module, actually requires the connections. The monument can be placed at various locations. According to the invention the line connections that are flexibly implemented within the monument adapt to the given position.

Such flexibility of the location of the monuments may be achieved by flexible inlet lines to the system connections within the monuments. With this flexibility the monument can be positioned even without separation of the system connection installation and independent from the system connection installation (as part of the system port flexibility). The system lines not required for the monument can be closed off and secured by means of closing caps.

By means of the solution according to the invention it may be achieved that:
- options for positioning the monuments are largely independent of system connections;
- there are no exclusion zones relating to monument locations; for example, due to the flexible option of connection to a system port that is arranged beside the cross beam, arrangement is possible even above the cross beam;
- fast configuration change in the cabin layout may be possible;
- in the production process a final cabin configuration can be determined relatively late;
- system line routes underneath the floor panels can be predefined so that it is possible to reliably plan all further systems that are to be installed underneath the floor panels;
- separate work-sharing of the installation work above and below the floor panels can be undertaken;
- a reduced number of components to be used (standardisation) is possible; and
- monuments can be of identical design, without there being any need to adapt a monument to particular system connection positions.

BRIEF DESCRIPTION OF THE DRAWINGS

The drawing shows embodiments of the invention that are described in more detail below with reference to FIGS. 1 to 4. Identical components in the figures have identical reference characters.

In the drawings.

DESCRIPTION OF A PREFERRED EMBODIMENT

Figure 1:
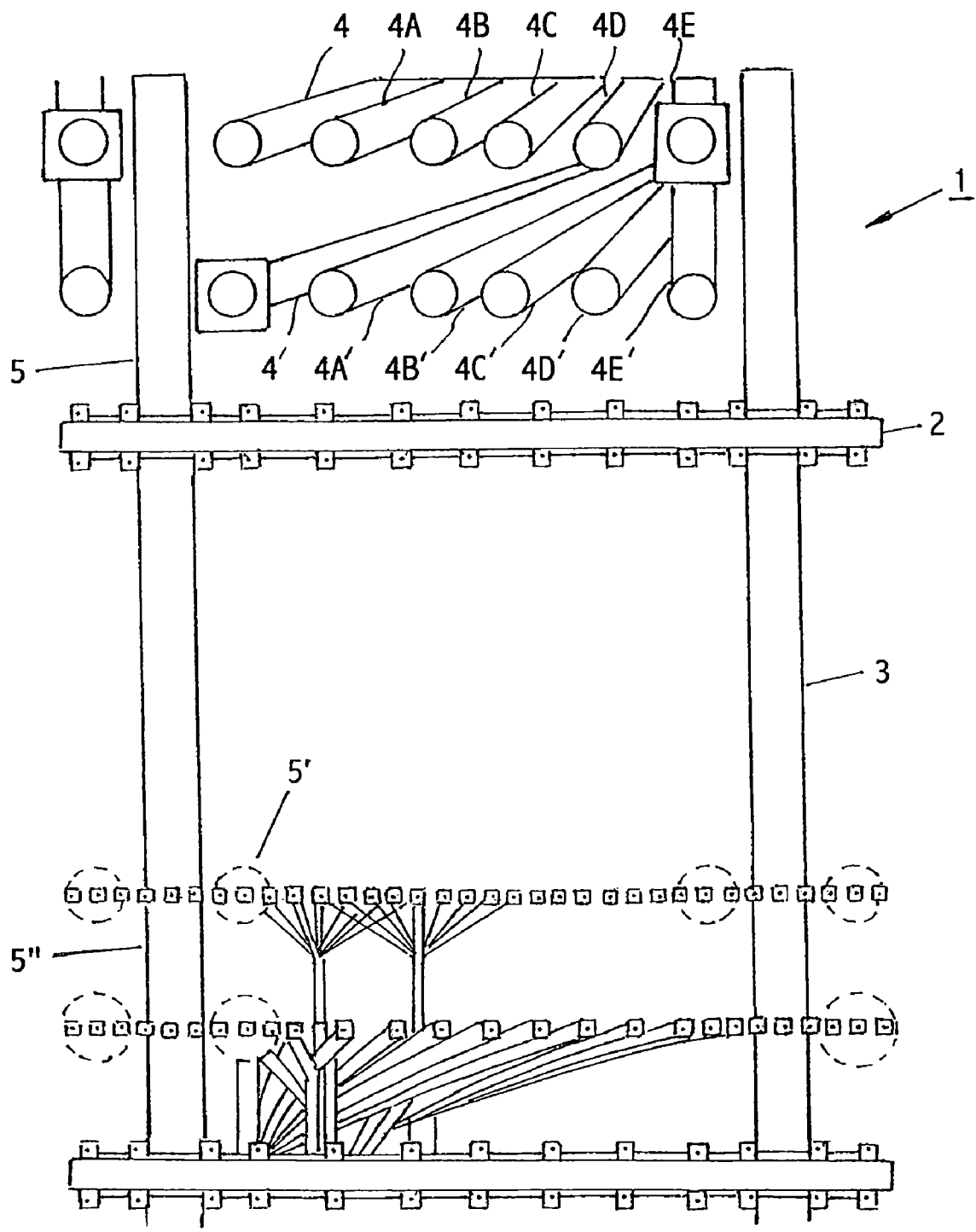
FIG. 1 shows a top view of a section of a floor structure, wherein system connections of the conventional type are shown.

FIG. 1 shows a top view of a section of a cabin layout of an aircraft passenger cabin 1. The longitudinal seat rails 2 and the transverse cross beams 3 are shown. The actually used line connections 4 are indicated by showing the connection flanges 5. For a monument or an installation space such as a toilet or a galley that is to be positioned in a defined location in the aircraft cabin 1 corresponding actual line connections 5, 5', 5" are for example provided. If an alternative positioning of the monument is to take place, the line connections are to be changed accordingly, and for these line connections alternative positions of alternative pipeline routes are necessary, for example connection is then to a pipeline 4A, 4A' . . . or 4B, 4B' . . . etc. The illustration of the manifold theoretical connection options clearly shows that if the position of a monument changes, this involves significant expenditure relating to construction effort and work time.

Figure 2:
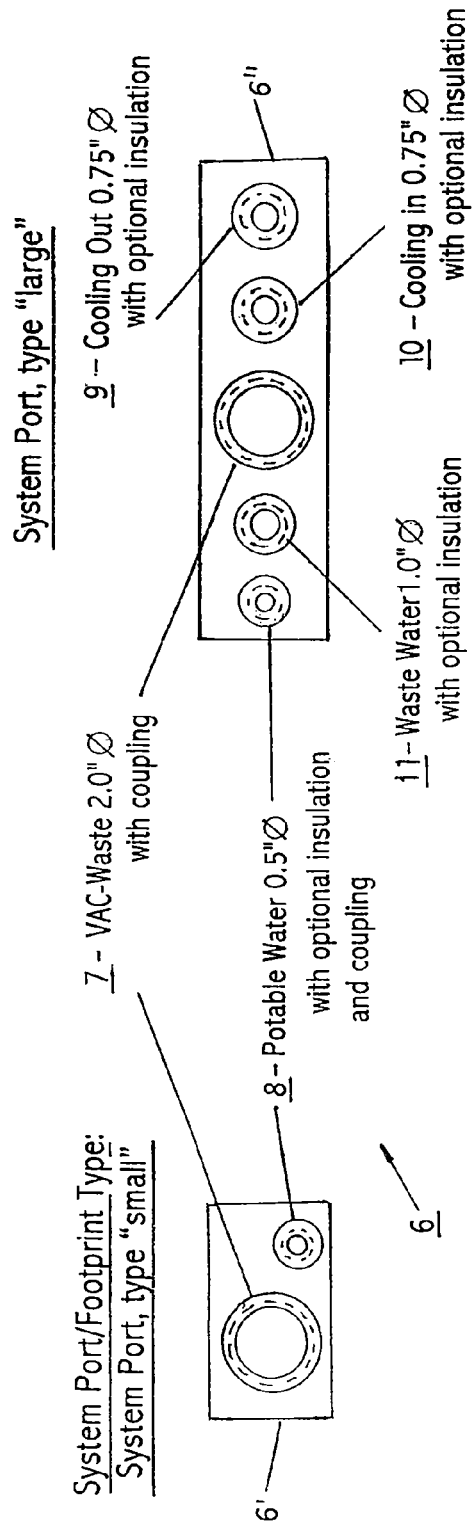
FIG. 2 shows two embodiment forms of system connection elements according to the invention.

FIG. 2 shows two embodiments of a line connection element 6 according to the invention. The line connection element 6 can also be designated as a system port; it incorporates the line connections that have to be provided for a monument. At the system port 6 the system lines routed below the floor are adapted correspondingly. Therefore, connections between two individual system lines are not necessary, the monuments 13 are supplied via the system port 6. A solution of this type allows a simplified and also relatively late fixing of the cabin configuration, which is of significant advantage precisely in the defining phase of an aircraft, since the desired changes of the client in the cabin layout may also be implemented relatively late.

The "small" embodiment 6', shown on the left-hand side in the illustration, comprises a line connection 7 for waste disposal (VAC waste) as well as a line connection 8 for potable water. In the embodiment 6", shown on the right-hand side of the illustration, of a "large" system port, apart from the line connection 7 for waste disposal (VAC waste) and a line connection 8 for potable water, system connections 9, 10 to the cooling system (cooling out, cooling in) and a connection 11 to the waste water system are also provided. If the system port 6 comprises connections to system lines that are not required, they can be closed off and secured by means of closing caps.

Figure 3:
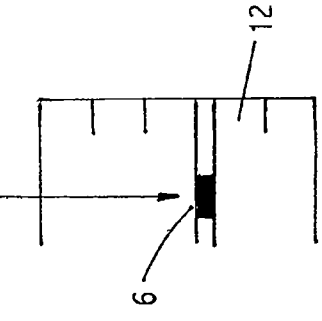
FIG. 3 shows an arrangement of a system connection element in the region of a floor panel.

FIG. 3 shows an installation arrangement of a system port 6. System ports 6 are provided as transition devices of the systems which extend below the floor panels 12 and to which a monument has to be connected. System ports 6 have a predefined position in the floor grid; they are integrated in the floor 12 but are only installed in those cases where a monument actually requires the connections. Since due to longitudinally changeable connection options a monument can be in one of various positions around the system port position or is slidable, the line connections that are flexible within the monument adapt to the given position.

Figures 4A, 4B:
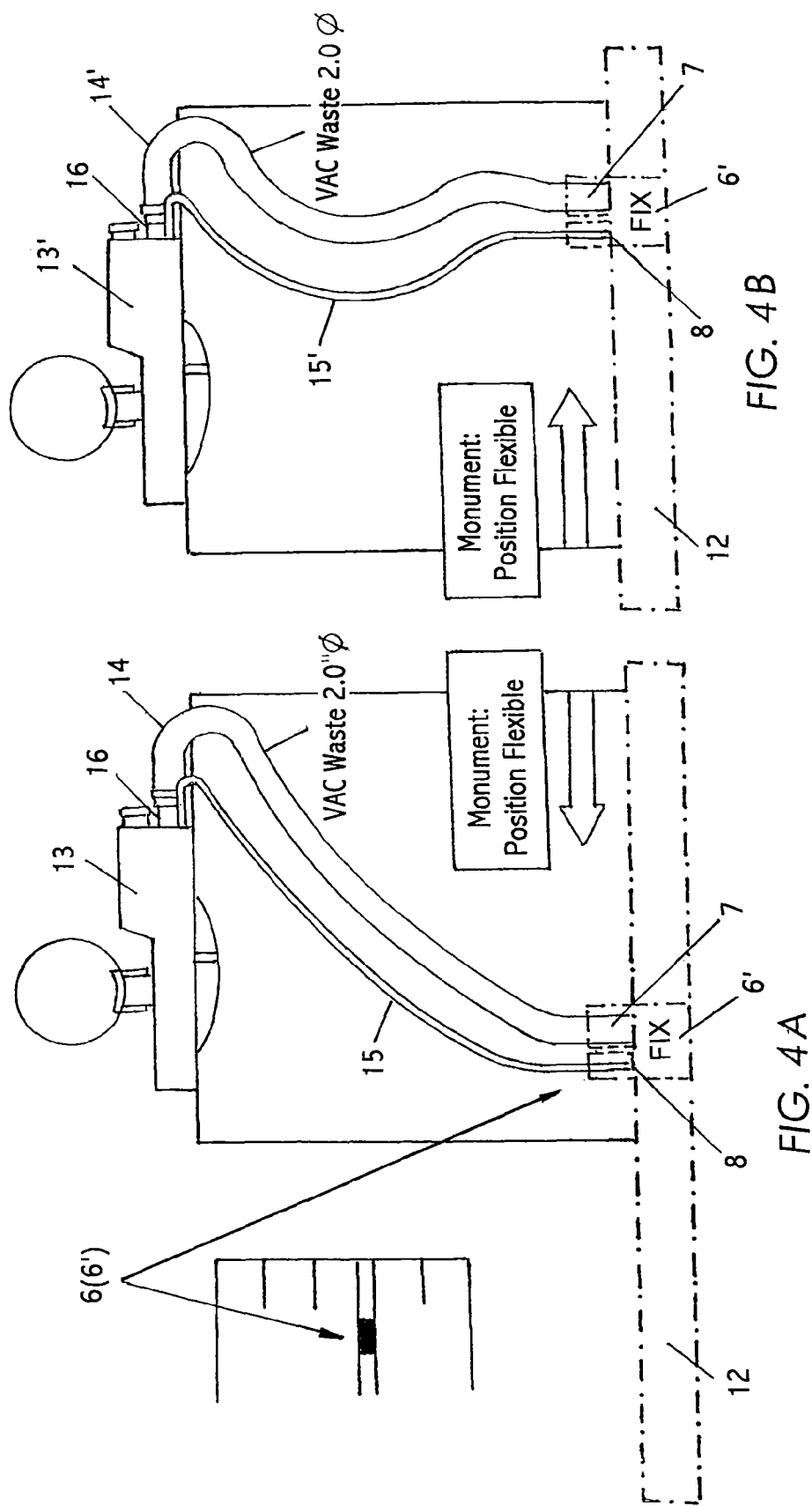
FIGS. 4A and 4B show, respectively, a sectional view of each of two embodiments of the system connection element, with differently positioned monuments.

FIGS. 4A and 4B show, respectively, a sectional view of each of two embodiments of the system port 6 in effective connection with a monument 13. By way of an example, in this embodiment the monument or the installation space 13 is a galley, wherein the monument comprises line connections 16, which, in the embodiment shown, are joined via inlet lines 14, 15 to a line connection 7 for VAC waste and to a line connection 8 for potable water of the system port 6' respectively. The system port 6' is in a fixed position in the floor grid 12. The monument line connections 16 are positioned above the monument 13 which is implemented as a galley. Because of the flexible inlet lines 14 and/or 15, these monument line connections are not restricted to this position, however, but may also be positioned at another location in accordance with the functionality of the monument 13, which optimizes the required line laying inside the monument as well. The illustrations of FIG. 4A (left-hand side) and FIG. 4B (right-hand side) show that the location flexibility of the monument 13 is achieved within the monuments by flexible inlet lines 14, 15. The monument can be located in alternative positions without separating the system connection installation (as part of system-port flexibility). The lengths of the lines 14 and 15 for the monument 13 in a first position compared to the lengths of the lines 14' and 15' in the position of the monument 13' have changed and may be seen through comparison of FIGS. 4A and 4B. This can be achieved through flexible lines or at least flexible line sections.

The changes in length of the lines within the installation space 13, which changes in length are necessary to provide flexibility of the inlet lines 14 and 15, can for example be achieved by lengths of the lines that can be varied in longitudinal direction of the lines. For example, corrugated flexible hoses, flexible lines or hoses, or pipes that can be slid one into another, are imaginable. Suitable holding devices and attachment options for the inlet lines 14 and 15 are provided at the installation space 13.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

What is claimed is:

1. An arrangement of at least one installation and at least two line connection ports in an aircraft passenger cabin, wherein
    an installation has several line connections;
    wherein the line connection ports are transition devices between aircraft systems below a floor grid of the aircraft passenger cabin and the at least one installation;
    wherein the line connection ports have fixed positions in the floor grid;
    wherein each of the line connection ports has several line connections;
    wherein the line connection ports are configured to be connected to system lines of the aircraft systems; and
    wherein one of the line connection ports is configured to be connected to the several line connections of the installation by way of flexible inlet lines,
    the at least one installation being movable relative to the line connection ports.

2. The arrangement of claim 1,
    wherein the several line connections of a line connection port correspond to the design of an installation as a galley.

3. The arrangement of claim 1,
    wherein the several line connections of a line connection port correspond to the design of an installation as a toilet.

4. The arrangement of claim 1,
    wherein the several line connections of a line connection port are designed such that, if they are not used, they can be closed off in the line connection port.

5. The arrangement of claim 1,
    wherein the installation comprises an installation space, within which installation space the flexible inlet lines can be adapted to position changes of the location of the installation space by means of adjustable lengths of the lines in a longitudinal direction.

6. The arrangement of claim 1,
wherein the inlet lines are corrugated flexible hoses.

7. The arrangement of claim 1,
wherein the inlet lines are flexible lines or hoses.

8. The arrangement of claim 1,
wherein the inlet lines are pipes that can be slid one into another.

* * * * *